(12) United States Patent
Carpenter et al.

(10) Patent No.: US 9,069,190 B2
(45) Date of Patent: Jun. 30, 2015

(54) EYEGLASS FRAME AND TEMPLE

(75) Inventors: Kester John Carpenter, Berlin (DE); Thomas Bochmann, Berlin (DE)

(73) Assignee: IC! BERLIN BRILLENPRODUKTIONS GMBH (DE)

( * ) Notice: Subject to any disclaimer, the term of this patent is extended or adjusted under 35 U.S.C. 154(b) by 180 days.

(21) Appl. No.: 13/821,205

(22) PCT Filed: Sep. 6, 2011

(86) PCT No.: PCT/EP2011/065361
§ 371 (c)(1),
(2), (4) Date: May 20, 2013

(87) PCT Pub. No.: WO2012/032026
PCT Pub. Date: Mar. 15, 2012

(65) Prior Publication Data
US 2013/0229613 A1   Sep. 5, 2013

(30) Foreign Application Priority Data

Sep. 6, 2010   (DE) .................... 20 2010 012 243 U
Jan. 27, 2011  (DE) .................... 20 2011 002 016 U (51) Int. Cl.
*G02C 5/16*   (2006.01)
*G02C 5/00*   (2006.01)
*G02C 5/22*   (2006.01)

(52) U.S. Cl.
CPC *G02C 5/16* (2013.01); *G02C 5/008* (2013.01); *G02C 5/2209* (2013.01); *G02C 5/2254* (2013.01); *G02C 2200/12* (2013.01); *G02C 2200/18* (2013.01); *G02C 2200/22* (2013.01)

(58) Field of Classification Search
CPC .... G02C 5/2254; G02C 2200/22; G02C 5/06; G02C 5/16
USPC ............. 351/113, 114, 111, 116, 153; 16/228
See application file for complete search history.

(56) References Cited

U.S. PATENT DOCUMENTS

| 3,155,982 | A  | * | 11/1964 | Baratelli ............................ 2/12 |
| 7,344,242 | B2 | * | 3/2008  | Habermann .................. 351/156 |
| 7,543,931 | B2 | * | 6/2009  | Proksch ........................ 351/113 |
| 8,042,939 | B2 | * | 10/2011 | Le Duy ......................... 351/153 |
| 8,827,444 | B1 | * | 9/2014  | Koo .............................. 351/121 |
| 2007/0121060 | A1 | * | 5/2007 | Habermann .................. 351/113 |

FOREIGN PATENT DOCUMENTS

| EP | 0863424 | 9/1998 |
| WO | WO2005111698 | 11/2005 |
| WO | WO2005111700 | 11/2005 |

* cited by examiner

*Primary Examiner* — Hung Dang
(74) *Attorney, Agent, or Firm* — Grossman, Tucker, Perreault & Pfleger, PLLC (57) ABSTRACT

The present invention relates to an eyeglass temple (1) and an eyeglass frame wherein the eyeglass temple (1) has at least two leaf springs (3; 4; 5). For preventing free sliding motion of the eyeglass temple means (15; 16; 17; 18; 20; 25) are provided which are realized such that they are able to inhibit said free sliding motion.

35 Claims, 8 Drawing Sheets

EYEGLASS FRAME AND TEMPLE

The present invention relates to an eyeglass frame comprising a rim and holder for the accommodation of lenses, respectively, and comprising two connection elements, one arranged on the left and one arranged on the right side of the rim for mounting a temple which on its frame-side end has at least two tongues or leaf springs disposed parallel to each other. Moreover the invention relates to a respective eyeglass temple.

With eyeglass frames such as known from EP 0 863 424 B2 the at least two leaf springs of the eyeglass frame cooperate with joint elements at the connection element of the frame to form a joint mechanism such that at least one leaf spring will, with one section of its internal surface facing towards the eyeglass frame, be supported under sliding contact by an abutment of the connection element during expanding and folding motion of the temple. This means that during expanding and folding, respectively, the section of the leaf spring will slide across the abutment of the connection element.

Furthermore, with filigree eyeglasses made of flat metal sheet such as disclosed in one embodiment of the above mentioned EP 0 863 424 B2 wherein the frame-side end of the temple has three leaf springs which are arranged parallel to each other, a specific effect resides in that the leaf springs are arranged in relation to each other in the pivoting plane such that the eyeglass temple will experience a spring force promoting expanding and/or folding. In this way the spectacle wearer will need to apply only very low manual force in order to expand and fold the temple respectively, as it will resiliently move inwardly or outwardly in a spontaneous way above a specific pivoting or angular position, respectively.

Said spring force will be created by spreading out resiliently tongues or leaf springs respectively during folding of the temple by the offset of at least one leaf spring in relation to at least another leaf spring. With one section of its internal surface or with an appropriate sliding surface the tongue or leaf spring respectively which is adjacent to the connection element will slide across a respective counter surface which is provided at the free end of the connection element, the front side of the free end facing towards the temple, substantially without resistance.

During folding of the temple this sliding motion is comfortable and without any problems. During expanding however this might be disadvantageous since expanding often occurs under comparatively high spring force and often will be erratic and unexpected.

Unfavorably, for example during storage of the eyeglasses in a coat or shirt pocket it might occur that one or both temples open spontaneously in the pocket and "leap up" making subsequent withdrawal difficult since the temples might get caught in the pocket of the garment and might become stuck. Such leaping up of the temples may possibly occur accidentally during withdrawal from the eyeglass case or from a pocket, entailing a risk of injuries. This unintended expansion especially occurs when metal contact between the leaf spring and respective abutment of the connection element, for example due to deposition of sweat and skin grease, will not be sufficient any more to keep the temple close to the frame against the spring action applied by the spring leaf.

Accordingly it is an object of the invention to provide an eyeglass frame as well as an appropriate temple which basically keeps the eyeglass temple from expanding spontaneously, especially one made of flat metal sheet, and avoids the disadvantages associated therewith.

The object will be solved by an eyeglass frame according to one of the claim 1, 5 or 17 as well as by an eyeglass temple according to one of the claim 21 or 32.

According to the invention an eyeglass frame will be suggested comprising temples and rims on each one of left and right sides, the frame comprising two connection elements, one arranged on the left and one arranged on the right side, the frame-side end of which facing towards the temple in its expanded state, each temple being divided by several tongues on the frame-side and each of the external tongues is provided with a cranked portion by means of which the frame is pivotally attached to a shoulder of the connection element such that the at least one central tongue of the temple slides with a sliding surface on a counter surface provided on the free end of the connection element, the at least one tongue having a swell or threshold which will hamper continuous motion of the center tongue.

The threshold forming a recess on the internal surface of the temple which faces towards the spectacle wearer is arranged in such a position on the tongue that the latter will come into engagement with the free end of the connection element in order to keep the eyeglass temple from expanding spontaneously from its folded position. Expanding is initially inhibited; the spectacle wearer has to apply a slightly increased force in order to overcome engagement between the threshold and the connection element and to be able to expand the temple, what however thereby will occur in a controlled manner.

Advantageously the tongues are formed as resilient tongues or leaf springs respectively, allowing the threshold to be formed therein by press molding or bending. The threshold which is located transversally to the longitudinal extend of the tongue may however be superimposed on the tongue; i.e. a separate threshold-like element will be arranged on the internal surface of the tongue.

In an alternative embodiment of the invention the object is solved by means of an eyeglass frame comprising a rim for the accommodation of lenses and comprising two connection elements, one arranged on the left and one arranged on the right side of the rim for mounting of a temple comprising an internal surface facing towards the spectacle wearer and comprising an external surface facing away from him, the temple having a very low thickness of material across its planar extend and the temple comprising at least two leaf springs arranged parallel to each other at its frame-side end, cooperating with joint elements at the connection element to form a joint mechanism such that one leaf spring will, with one section of the internal surface, be supported under sliding contact by an abutment of the connection element during folding and expanding motion of the temple, the section comprising at least a means which is formed to prevent self-sliding motion of the section at the abutment. The invention is especially characterized in that the means is provided at the internal surface of the frame and the external surface of the temple has a continuous planar extend.

Since the eyeglass temple according to the present invention including the internal surface and external surface thereof basically has a continuous planar extend which in relation to the actual thickness of material is very large, in this embodiment of the present invention the means does not interfere with the form and appearance of the eyeglass temple on its external surface. The latter still has a continuous smooth surface. The present invention therefore is useful for eyeglass temples which are made of a flat metal sheet such as spring steel. The principle suggested according to the present invention is also applicable to other materials.

The means according to the invention keeps the eyeglass temple from leaping up since due to the increased sliding resistance the section of the at least one leaf spring will be kept from sliding across the abutment without external force applied. According to the invention resistance is selected such that the force counteracting free sliding of the section across the abutment is at least sufficient to require in any case manual actuation of the temple for its expanding and folding, respectively.

According to the invention this will allow to specifically identify the kind, specific embodiment and number of the means depending on the inherent spring force for folding and expanding of the eyeglass temple which is provided for the eyeglass temple on the one hand and on the other hand depending on the material and thereby on the own weight of the eyeglass temple.

In one embodiment of the present invention the means is realized such that it will increase friction between the abutment and the section.

Accordingly it may be an appropriate coating of the section which basically is able to increase the friction between the section and the abutment. For this the surface of the section facing the frame of the eyeglasses may be roughened by mechanical processing steps as compared to the remaining internal surface of the eyeglass temple. Alternatively a coating consisting of rubber or similar materials may be coated onto the region of the section.

Furthermore the object will also be solved by an eyeglass frame comprising a rim for the accommodation of lenses and comprising two connection elements, one arranged on the left and one arranged on the right side of the rim for mounting of a temple comprising an internal surface facing towards the spectacle wearer and comprising an external surface facing away from him, the temple comprising at least two leaf springs arranged parallel to each other at its frame-side end, cooperating with joint elements at the connection element to form a joint mechanism such that one leaf spring will, with one section of the internal surface, be supported under sliding contact by an abutment of the connection element during folding and expanding motion, the section comprising at least one recess keeping the section from self-sliding motion at the abutment.

That is, according to the invention, the means is at least formed as a recess which opens towards the spectacle wearer in the internal surface of the leaf spring or tongue, respectively.

This recess may be provided as a small circular and cup-like well. Preferably the abutment of the connection element then has a small nose-like extension or another minor projection which approximately is formed in a form complementary to the well. The well in the internal surface of the spring leaf then is located in such a position near the free end of the spring leaf that the extension will engage with the recess exactly at that time when the eyeglass frame will be in the folded state in relation to the frame in order to lock the eyeglass temples in that position. The extension and well may integrally be formed as a smooth locking mechanism which surely is sufficient to counteract the spring force although it may easily be released manually.

An array of preferably equally spaced apart recesses opening towards the spectacle wearer has proven to be especially advantageous.

This may be realized by a set of serially arranged recesses migrating across the extension during folding and expanding motion. In one particular embodiment of the invention these recesses however are formed in a groove like manner extending substantially transversally to the longitudinally extending leaf spring.

The recesses may thereby extend from both edges of the leaf spring towards a vertex which is aligned in the direction of the free rear end of the temple whereby the recesses may also be formed as an arch or circle or as two straight lines extending towards the vertex.

Especially with eyeglass frames made of flat metal sheet wherein, besides the rim and the connection element, the eyeglass temple is also made of sheet metal such that the latter has a very low thickness of material transversally to its surface expansion, such recesses may be manufactured in a simple way without hampering the external surface of the eyeglass temple.

Etching techniques and ablation by laser have proven useful for this allowing the recesses to be located at the internal side of the eyeglass temple without hampering the outwardly facing surface of the eyeglass temple, i.e. the surface of the eyeglass temple averted from the spectacle wearer, in the area of the processed section. The latter will still show a continuously smooth metal surface after material processing. These processes enable formation of recesses at the internal surface of the leaf spring and the eyeglass temple, respectively, the internal surface showing a low depth but which is still sufficient to prevent sliding motion of the leaf spring across the abutment despite of the very low thickness of material of the leaf spring.

In one embodiment of the eyeglass frame of the invention the means is formed such that it is able to retain the leaf spring in an angular position in relation to the frame if no external force is applied to the eyeglass temple and consequently to the leaf spring. Briefly the means will be able to lock the eyeglass temple in such a relative position unless it will be actuated manually.

According to the invention the connecting element of the frame may have vertical recesses and the frame-side end of the temple is divided into three leaf springs which are arranged parallel to each other, the central leaf spring comprising the means for inhibition of free sliding motion. With expanded temple the central leaf spring will with its free end be adjacent to the surface of the connection element which is averted from the face of the spectacle wearer and the two external leaf springs will initially be adjacent to the surface of the connection element facing the face of the spectacle wearer in the direction of their free ends and then will pass the vertical recesses of the connection element and finally will become adjacent to the surface of the connection element which is averted from the face of the spectacle wearer.

By forming such a joint mechanism as it is for example described in the European Patent No. 0 863 424 the leaf springs are mounted towards each other to the rim of the eyeglasses frame such that they exert a spring action promoting folding and expanding motion of the temple. The connection element has, at its front-side end facing the temple an abutment in the form of a front-side notch through which the central leaf spring passes with its section comprising the means for preventing the sliding motion and comprising the at least one recess, respectively, during folding and expanding.

The means, however, does not necessarily need to be arranged at the central leaf spring. Alternatively it is also possible that one or both external leaf springs include this means in the sections, which during folding and expanding pass the vertical recesses, the edges of the recesses then acting as the respective abutments.

Furthermore a joint mechanism such as disclosed in the international applications WO 2005/111700 and WO 2005/

111698, which herein are incorporated by reference in their entirety, may be employed for such eyeglass temples.

The invention also relates to an eyeglass temple having the features mentioned above and the mode of operation associated therewith.

Additional advantages and features of the present invention will arise from the illustrative examples represented by the attached figures, wherein FIGS. 1*a, b* show a state-of-the-art eyeglass temple comprising three leaf springs and the joint mechanism associated therewith.

Figure 1A:
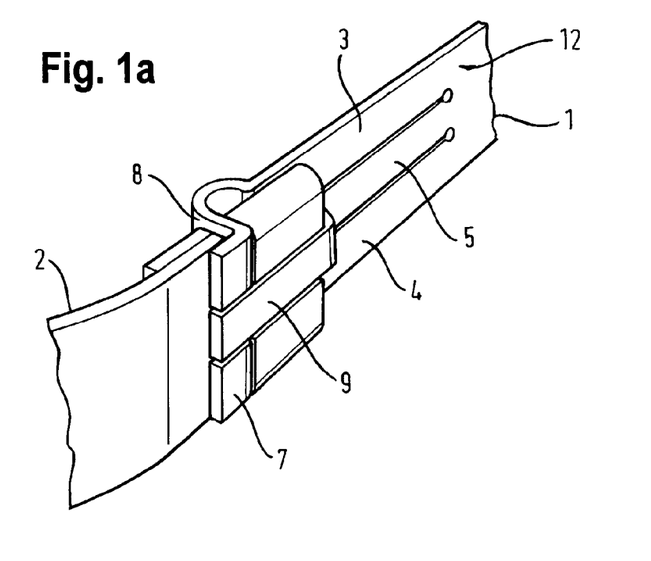
Figure 1B:
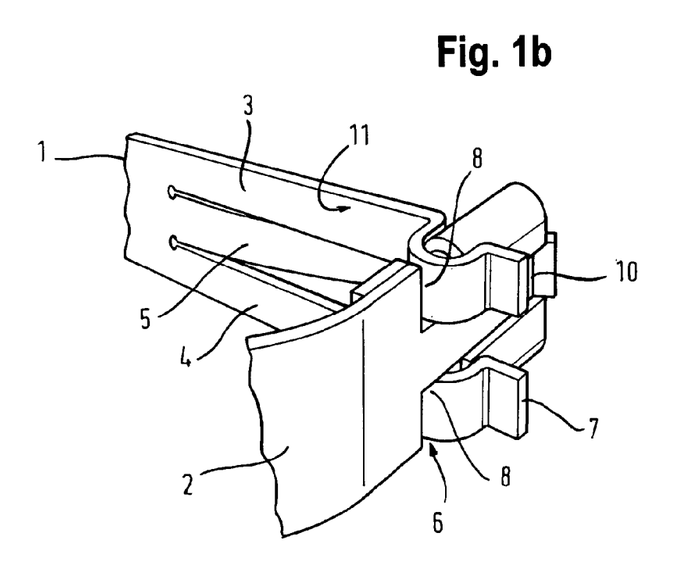

FIGS. 1*a* and 1*b* each show an eyeglass temple 1 which can be produced of flat metal sheet known from prior art such as from EP 0 863 424 B2 which is hinged to a connection element 2 of a frame or rim, respectively, herein not illustrated in detail (cf. rim 23 in FIGS. 7*a*-8*b*), of an eyeglass frame.

The eyeglass temple 1 has three leaf springs or tongues, respectively, at its frame-side end, i.e. at the end abutting against connection element 2 that is two external leaf springs 3 and 4 and one central leaf spring 5 surrounded by the latter two.

The connection element 2 has recesses 6 overlying each other in vertical alignment which are passed by the free ends 7 of each of the external leaf springs 3 and 4, adjacent to bends 8 of these leaf springs 3 and 4. In this way a simple joint mechanism will be created.

As is seen in FIG. 1*a* showing the expanded state of the eyeglass temple 1, the central leaf spring 5 is adjacent to the surface of the connection element 2 which is averted from the face of the spectacle wearer with its free end 9 whereas the two external leaf springs 3 and 4 are initially adjacent to the surface of the connection element 2 facing the face of the spectacle wearer and then pass each vertical recess 6 of the connection element 2 and finally become adjacent to the surface of the connection element 2 which is averted from the face of the spectacle wearer. The vertical recess 6 form kind of a shoulder for the guidance of the two external leaf springs 3 and 4.

During folding as it is exemplified in FIG. 1*b* the bends 8 of the external leaf springs pass recesses 6 of the connection element 2 while the central leaf spring 5 is supported by the front-side end of connection element 2 forming an abutment 10. The central leaf spring will thereby be spread in relation to the external leaf springs 3 and 4 thus generating a spring action which then will be able to promote expanding and folding motion of temple 1.

This is possible since temple 1 is made of a material such as spring steel such that it has a planar extend comprising an internal surface 11 and an external surface 12 wherein as can be seen from FIGS. 1*a* and 1*b* the thickness of material of temple 1 and leaf springs 3, 4 and 5 substantially is very low in relation to the planar extend thereof.

During motion of the central leaf spring 5 across the abutment 10 with a section 13 forming a sliding surface, while folding and expanding the temple 1 a sliding contact between abutment 10 which preferably may be formed as a notch at the front side of connection element 2 facing the temple and the central leaf spring 5 will be established.

Figures 7A, 7B:
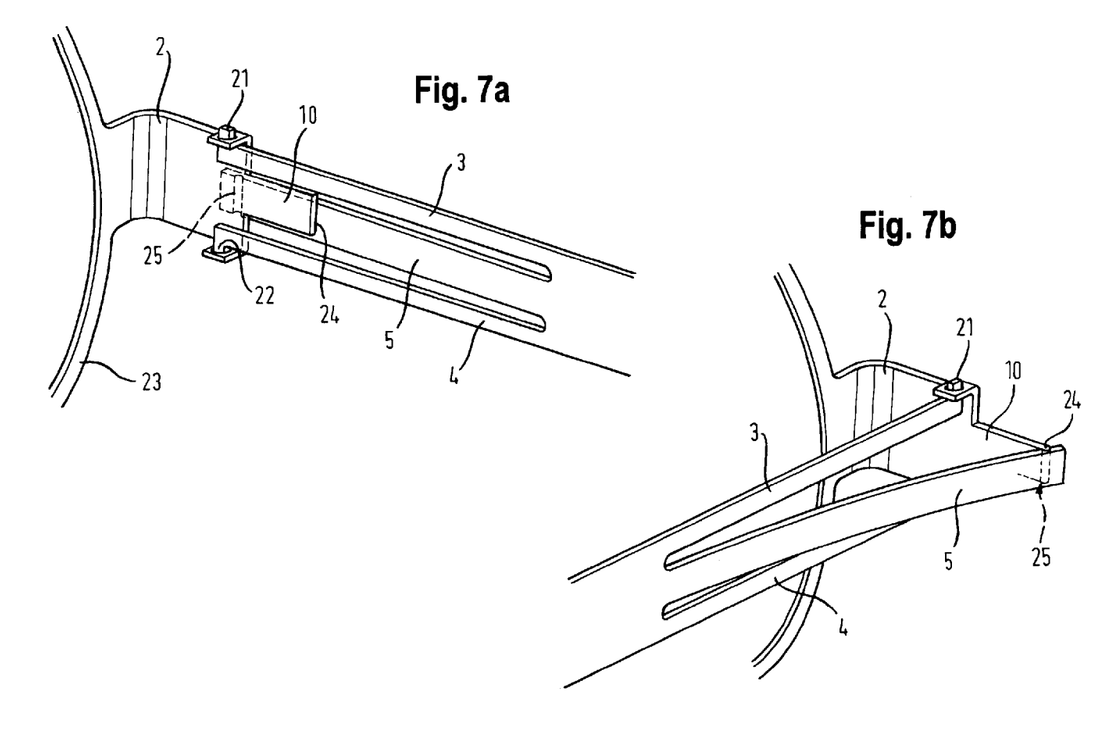
FIGS. 7*a*, 7*b* show, by way of example, an eyeglass temple comprising three leaf springs and the joint mechanism realized thereby comprising a single transverse groove.
Figure 8A:
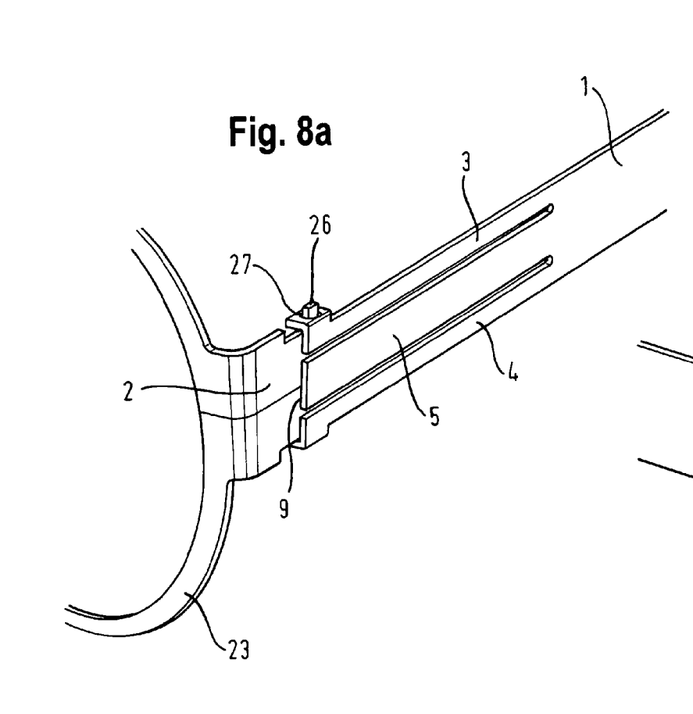
FIGS. 8*a, b* show, by way of example, another eyeglass temple comprising three leaf springs, and the joint mechanism realized therewith including the fourth embodiment of the means for the inhibition of the free sliding motion.
Figure 8B:
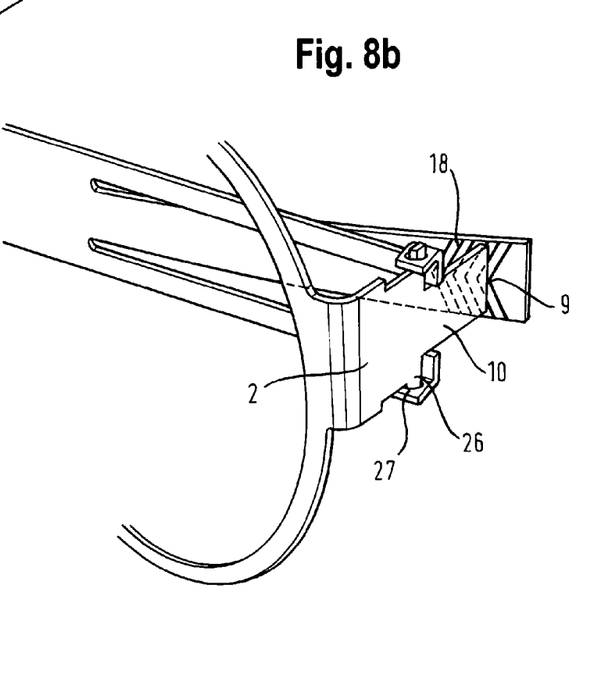

Under certain circumstances friction during sliding contact between section 13 and counter-face of the abutment 10 may not be sufficient any more for self-retaining temple 1 especially in the folded position, and counteracting the intrinsic spring action of the temple 1 adjusting itself by the relative spreading of the external leaf springs 3, 4 in relation to the central leaf spring 5 (see also FIGS. 7*b* and 8*b*). There will be the risk that temple 1 will leap up spontaneously during unfavorable handling.

For prevention, the invention discloses a means which is embodied such that it sufficiently counteracts a self-acting sliding motion of the central leaf spring 5.

According to the invention the means is arranged in section 13 of the internal surface 11 of the central leaf spring 5, moving across abutment 10 during pivoting of temple 1.

Figure 2A:
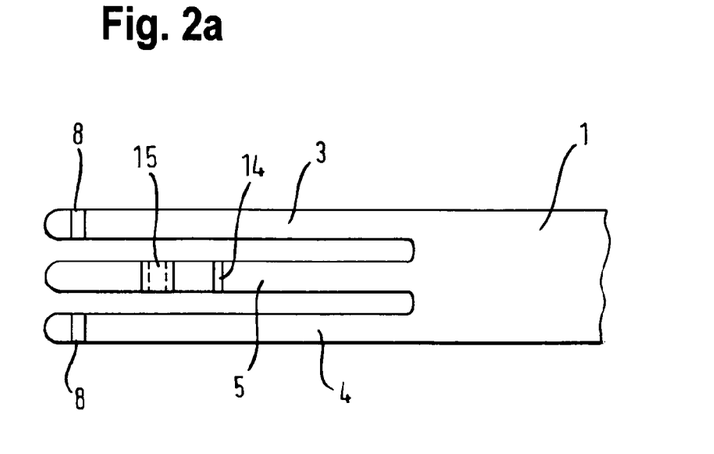
FIGS. 2*a, b* are partial views of a first embodiment of an eyeglass temple according to the present invention.
Figure 2B:
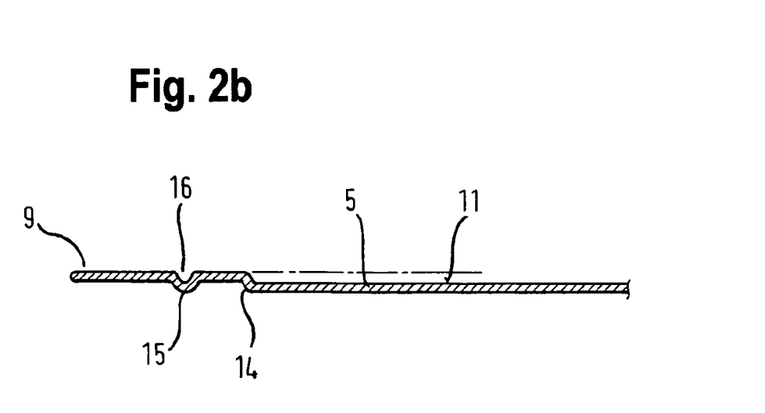

In FIGS. 2*a* and 2*b* the means is shown in a first embodiment. The central leaf spring 5 has a cranked section 14. In longitudinal direction the central leaf spring 5 comprise a swell or threshold 15 between this cranked section 14 and its free end 9, the threshold 15 forming a recess 16 in the internal surface 11 of the temple facing towards the spectacle wearer, the recess 16 engaging the abutment 10 of the connection element in the folded state, as it is demonstrated in FIG. 7*b*. The recess 16 and the threshold 15 respectively can be produced by press molding.

Figure 3A:
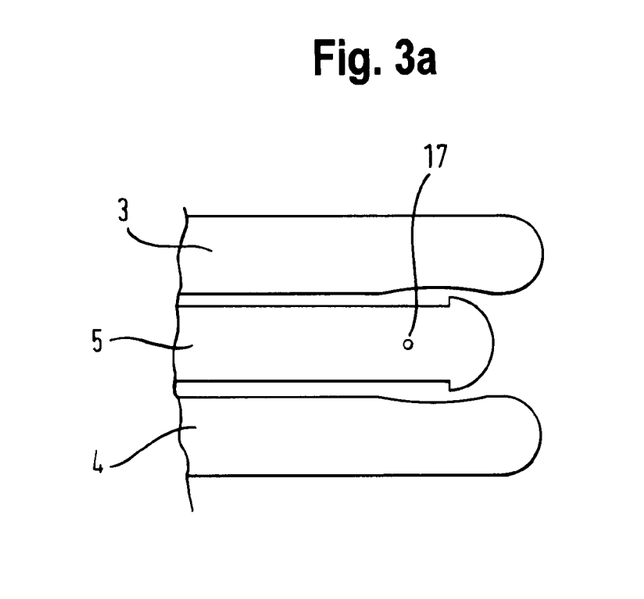
FIG. 3*a* is a partial view of a second embodiment of an eyeglass temple according to the present invention.
Figure 3B:
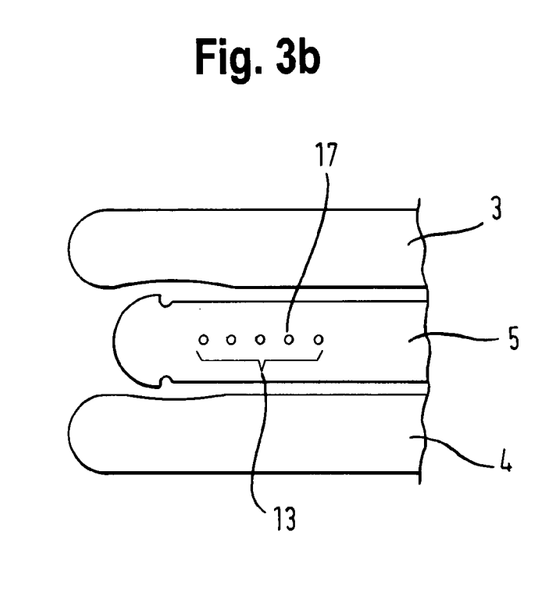
FIG. 3*b* is a partial view of a third embodiment of an eyeglass temple according to the present invention.

FIG. 3*a* shows a second embodiment, wherein a well-like recess 17 is provided in the internal surface 11 of the central leaf spring 5. This recess 17 may for example cooperate with an appropriate nose-like protrusion not shown herein and arranged at the front side of the free end of the abutment 10, forming a smooth-running snap fit connection. As shown in FIG. 3*b* such recesses 17 may also be arranged in series in section 13 of the central leaf spring 5 which moves across abutment 10 wherein recesses 17 which are arranged in one line then alternately cooperate with the protrusion.

Figure 4:
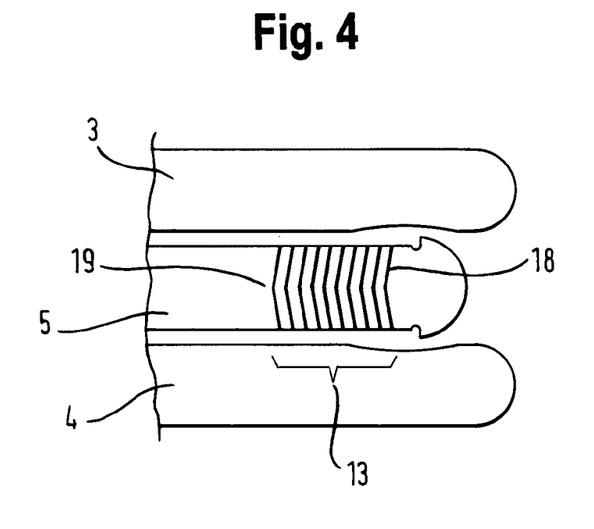
FIG. 4 is a partial view of a fourth embodiment of an eyeglass temple according to the present invention.
Figure 5:
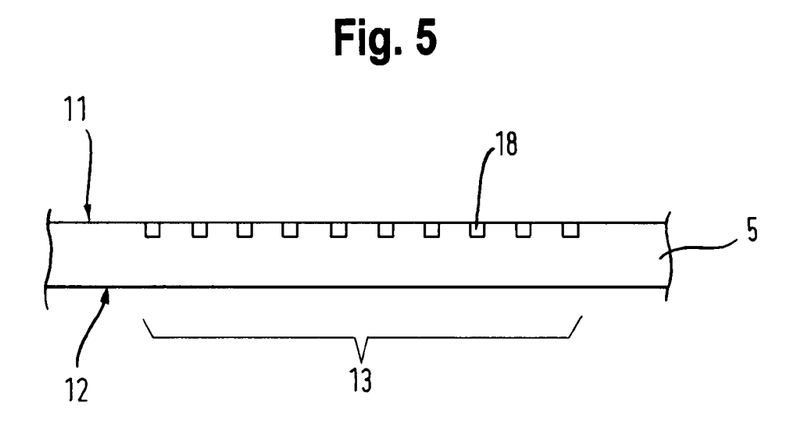
FIG. 5 is a lateral view of this eyeglass temple.

The FIGS. 4 and 5 show, by way of example, a preferred fourth embodiment of the eyeglass temple 1 according to the present invention.

In this embodiment section 13 of internal surface 11 of the central leaf spring 5 consists of an array of recesses formed as grooves 18, arranged equally spaced apart in parallel to each other.

The grooves 18 which preferably will be introduced into the surface of section 13 by way of laser ablation or etching have very low depth such that the external surface 12 of the central leaf spring 5 still will be maintained as a continuous surface as shown by way of example in the lateral view of the central leaf spring 5 according to FIG. 5. A preferred depth of recess 18 will be for example in the order of about 0.25 mm while the thickness of material of temple 1, in relation thereto, is about 1 mm.

The grooves 18 may substantially extend transversally to the longitudinal direction of the temple 1. Preferably the groove-like recesses 18 are however formed as two lines extending towards a vertex 19, the lines aligning in the direction towards the rear end of temple 1 that is toward the end facing away from the frame and connection element 2.

Section 13 including recesses 18 is moved during folding and expanding of temple 2 across the counter-face of the front-side abutment 10 causing a respective friction increasing resistance keeping the temple 1 from spontaneously being released, i.e. without manually applying a respective external force by the spectacle wearer. This is exemplified in FIG. 8*b*.

In a further embodiment of the invention the depth and form of the previously described means for the inhibition of free sliding motion will be selected such that the abutment 10 may virtually snap into these means, thus being able to retain temple 1 in a defined angular position in relation to the rim of the eyeglass frame.

Figure 6:
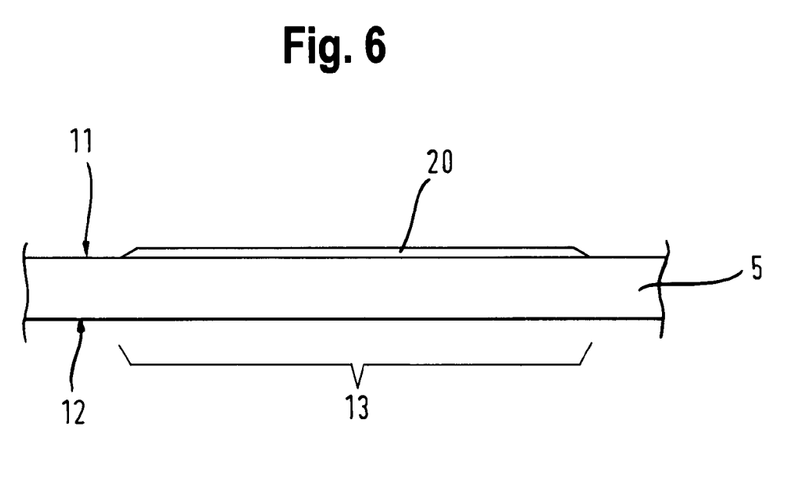
FIG. 6 is part of a lateral view of a fifth embodiment of an eyeglass temple according to the present invention.

In FIG. 6 a further embodiment of the invention is shown. The means for the inhibition of free sliding motion of the central leaf spring 5 is realized by a friction-increasing coating 20 which may be formed as thin rubber coating coated onto the internal surface thereof.

The FIGS. 7*a* and 7*b* basically show the functioning of snapping into a single recess extending transversally to the central leaf spring, such as in the embodiment comprising a threshold but comprising different joint mechanism for the attachment of temple 1.

The external leaf springs 3, 4 of temple 1 have pins 21 opposite to each other on their free ends engaging in eyelets 22 arranged on the connection element 2 to form an axis of articulation of a pivot joint. The connection element extends from a frame and a rim 23, respectively, toward temple 1.

The abutment 10 of the connection element 2 for the central leaf spring 5 is formed as a strut extending from the connection element 2 towards the temple 1 such that the external leaf springs 3, 4 may pass across the abutment 10 while pivoting. The free end 24 of the abutment will, in the folded state, engage in a transverse groove 25 provided appropriately at the internal surface 11 of the central leaf spring 5 thus forming a snap-in connection which is allowed to be released manually with ease but which does not yield spontaneously to the spring action provided by leaf springs 3, 4, 5.

In FIGS. 8*a* and 8*b* another joint mechanism is shown wherein the connection element 2 comprises pins 26 engaging the respective eyelets 27 which are situated at the free ends of the external leaf springs 3, 4 to form a pivot joint. In this embodiment the abutment also extends towards the temple 1, the external leaf springs 3, 4 passing across the abutment 10.

The section 13 of the central leaf spring 5 comprises an array of designated grooves 18 cooperating with the front-side end 24 of the abutment 10 in a friction increasing manner such that a free sliding motion induced by the spring force of leaf springs 3, 4, 5 which would result in unintended leaping up of the temple 1 will be inhibited.

It will be obvious that the means according to the invention previously described can be manufactured with ease especially the means for preventing uninhibited sliding motion introduced into the internal surface 11 and imposed thereon will not influence the appearance important to eyeglasses since they do not alter or deform the external surface 12 of temple 1 and of the central leaf spring 5 thereof.

The invention claimed is:

1. An eyeglass frame comprising a temple (1) on each one of a left and right side and comprising a rim (23) comprising a connection element (2) on each one of the left and right side, a temple-side end of which facing towards the temple (1) in an expanded state, each temple (1) being divided by several tongues (3; 4; 5) including external tongues (3, 4) by means of which the temple (1) is pivotally attached to a shoulder of the connecting element (2) and at least one central tongue (5), wherein an internal surface (11) of the at least one central tongue (5) slides along a counter surface (10; 24) provided at a free end of the connection element (2) during pivoting, and wherein the at least one central tongue (5) has a threshold (15) inhibiting a continuous sliding motion of the internal surface (11) of the central tongue (5) along the counter surface (10; 24).

2. The eyeglass frame according to claim 1 wherein the threshold (15) is arranged transversally on the at least one central tongue (5).

3. The eyeglass frame according to claim 1 wherein the threshold (15) is formed integrally with the at least one central tongue (5).

4. The eyeglass frame according to claim 1 wherein the threshold (15) is superimposed onto the at least one central tongue (5).

5. An eyeglass frame comprising a rim (23) for the accommodation of lenses and comprising two connection elements (2), one arranged on the left and one arranged on the right side of the rim (23) for mounting a temple (1) comprising an internal surface (11) facing the spectacle wearer and comprising an external surface (12) facing away from him, the temple (1) having very low thickness of material transversally to its planar extend and wherein the temple (1) at its frame-side end comprising at least two leaf springs (3; 4; 5) arranged parallel to each other cooperating with joint elements (8; 21; 22; 26; 27) at the connection element (2) to form a joint mechanism such that one leaf spring (3; 4; 5) will, with one section (13) of the internal surface (11), be supported under sliding contact by an abutment (10; 24) of the connection element (2) during expanding and folding motion of the temple (1), the section (13) comprising at least a means (15; 17; 18; 20; 25) that is realized such that it will prevent self-acting sliding movement of section (13) at the abutment (10; 24), characterized in that the means (15; 16; 17; 18; 20; 25) is provided at the internal surface (11) of the temple (1) and the external surface (12) of the temple (1) has a continuous planar extend.

6. The eyeglass frame according to claim 5 wherein the means (15; 17; 18; 20; 25) is realized such that friction between the abutment (10; 24) and the section (13) is increased.

7. The eyeglass frame according to claim 6 wherein section (13) has a friction increasing coating (20).

8. The eyeglass frame according to claim 5 wherein the means (15; 17; 18; 20; 25) is realized such that it will retain temple (1) in an angular position in relation to the frame (23) if no external force will be applied to the temple (1).

9. The eyeglass frame according to claim 5 wherein the means is formed in the internal surface (11) as at least one recess (16; 17; 18; 25) which opens towards the spectacle wearer.

10. The eyeglass frame according to claim 9 wherein the abutment (10; 24) has an extension engaging the recess (16; 17; 18; 25) if the temple is completely folded.

11. The eyeglass frame according to claim 5 wherein the means is formed as an array of recesses (17; 18) spaced apart from each other.

12. The eyeglass frame according to claim 11 wherein the recesses (17; 18) are substantially transversally to the longitudinal extend of the leaf spring (3; 4; 5).

13. The eyeglass frame according to claim 12 wherein the recesses (17; 18) extend from both edges of the leaf spring (3; 4; 5) towards a vertex (19) in the direction of the free rear end of the temple (1).

14. The eyeglass frame according to claim 9 wherein the recesses (17; 18) in the internal surface (11) are produced by drilling, milling, etching or by laser ablation.

15. The eyeglass frame according to claim 5 wherein the connection element (2) has vertical recesses (6) and the frame-side end of the temple (1) is divided into three leaf springs (3; 4; 5) arranged parallel to each other, the central leaf spring (5) comprising the means (15; 17; 18; 20; 25), wherein, with expanded temple (1), the central leaf spring will with its free end be adjacent to the surface of the connection element (2) which is averted from the face of the spectacle wearer and the two external leaf springs (3; 4) will initially be adjacent to the surface of the connection element (2) facing the face of the spectacle wearer in the direction of their free ends and then will pass the vertical recesses (6) of the connection element (2) and finally will become adjacent to the surface of the connection element (2) which is averted from the face of the spectacle wearer.

16. The eyeglass frame according to claim 15 wherein the leaf springs (3; 4; 5) exert a spring action promoting folding and expanding motion of the temple (1) and the means (15; 17; 18; 20; 25) of the central leaf spring (5) is realized such that it will prevent spontaneous folding and expanding motion of temple (1) which is promoted by said spring action.

17. An eyeglass frame comprising a rim (23) for the accommodation of lenses and comprising two connection elements (2), one arranged on the left and one arranged on the right side of the rim (23) for mounting of a temple (1) comprising an internal surface (11) facing towards the spectacle wearer and comprising an external surface (12) facing away from him, the temple (1), the temple comprising at least two leaf springs (3; 4; 5) arranged parallel to each other at its frame-side end, cooperating with joint elements (8; 21; 22; 26; 27) at the connection element (2) to form a joint mechanism such that one leaf spring (3; 4; 5) will, with one section (13) of the internal surface (11), be supported under sliding contact by an abutment (10; 24) of the connection element (2) during folding and expanding motion of the temple (1), characterized in that the section (13) comprises at least one recess (16; 17; 18; 25) preventing spontaneous sliding motion of section (13) at the abutment (10; 24).

18. The eyeglass frame according to claim 17 wherein the at least one recess (16; 17; 18; 25) is substantially transversally to the longitudinal extend of the leaf spring (3; 4; 5).

19. The eyeglass frame according to claim 18 wherein the at least one recess (16; 17; 18; 25) extends from both edges of the leaf spring (3; 4; 5) towards a vertex (19) in the direction of the free rear end of the temple (1).

20. The eyeglass frame according to claim 17 wherein the leaf springs (3; 4; 5) exert a spring action promoting folding and expanding motion of the temple (1) and the at least one recess (16; 17; 18; 25) is realized such that it will prevent spontaneous folding and expanding motion of temple (1) which is promoted by said spring action.

21. An eyeglass temple (1) comprising an internal surface (11) facing towards the spectacle wearer and comprising an external surface (12) facing away from him, the eyeglass temple (1) having a very low thickness of material across its planar extend, and wherein the end thereof which is to be mounted pivotably to a connection element (2) of a rim (23) of an eyeglass frame consists of at least two leaf springs (3; 4; 5) arranged parallel to each other cooperating with joint elements (8; 21; 22; 26; 27) at the connection element (2) to form a joint mechanism such that one leaf spring (3; 4; 5) can, with one section (13) of the internal surface (11), be supported under sliding contact by an abutment (10; 24) of the connection element (2) during folding and expanding motion of the temple (1), the section (13) comprising at least a means (15; 16; 17; 18; 20; 25) which is formed to prevent self-sliding motion of the section (13) at the abutment (10; 24), characterized in that the means (15; 16; 17; 18; 20; 25) is provided at the internal surface (11) of the eyeglass temple (1) and the external surface (12) of the eyeglass temple (1) has a continuous planar extend.

22. The eyeglass temple according to claim 21 wherein the means (15; 16; 17; 18; 20; 25) is realized such that the friction between the abutment (10; 24) and the section (13) will be increased.

23. The eyeglass temple according to claim 22 wherein the section (13) comprises a friction-increasing coating (20).

24. The eyeglass temple according to claim 21 wherein the means (15; 16; 17; 18; 20; 25) is realized such that it will be able to retain temple (1) in an angular position in relation to the rim (23) if no external force will be applied to the eyeglass temple (1).

25. The eyeglass temple according to claim 21 wherein the means is formed as at least one recess (16; 17; 18; 25) in the internal surface (11) which opens towards the eyeglass wearer.

26. The eyeglass temple according to claim 25 wherein the recess (16; 17; 18; 25) is arranged in the internal surface (11) such that it will engage with an extension of the abutment (10; 24) if temple (1) is folded completely.

27. The eyeglass temple according to claim 25 wherein the recesses (16; 17; 18; 25) in the internal surface (11) are produced by drilling, milling, etching or by laser ablation.

28. The eyeglass temple according to claim 21 wherein the means is formed as an array of recesses (17; 18; 25) spaced apart from each other.

29. The eyeglass temple according to claim 28 wherein the recesses (17; 18; 25) are substantially transversally to the longitudinal extend of the leaf spring (3; 4; 5).

30. The eyeglass temple according to claim 29 wherein the recesses (18) extend from both sides of the leaf spring (3; 4; 5) towards a vertex (19) in the direction of the free rear end of the temple (1).

31. The eyeglass temple according to claim 21 wherein the frame-side end consists of three leaf springs (3; 4; 5) arranged parallel to each other and the central leaf spring (5) comprises the means (15; 17; 18; 20; 25).

32. An eyeglass temple (1) comprising an internal surface (11) facing towards the spectacle wearer and comprising an external surface (12) facing away from him, wherein the end thereof which is to be mounted pivotably to a connection element (2) of a rim (23) of an eyeglass frame consists of at least two leaf springs (3; 4; 5) arranged parallel to each other cooperating with joint elements (8; 21; 22; 26; 27) at the connection element (2) to form a joint mechanism such that one leaf spring (3; 4; 5) can, with one section (13) of the internal surface (11), be supported under sliding contact by an abutment (10; 24) of the connection element (2) during folding and expanding motion of the temple (1), characterized in that the section (13) has at least one recess (16; 17; 18; 25) preventing spontaneous sliding motion of the section (13) at the abutment (10; 24).

33. The eyeglass temple according to claim 32 wherein the at least one recess (16; 17; 18; 25) is substantially transversally to the longitudinal extend of the leaf spring (3; 4; 5).

34. The eyeglass temple according to claim 33 wherein the at least one recess (16; 17; 18; 25) extends from both edges of the leaf spring (3; 4; 5) towards a vertex (19) in the direction of the free rear end of the temple (1).

35. The eyeglass frame according to claim 32 wherein the leaf springs (3; 4; 5) exert a spring action promoting folding and expanding motion of the temple (1) and the at least one recess (16; 17; 18; 25) is realized such that it will prevent spontaneous folding and expanding motion of temple (1) which is promoted by said spring action.

\* \* \* \* \*